United States Patent

Zirkiev

[11] Patent Number: 5,745,999
[45] Date of Patent: May 5, 1998

[54] FOOD SLICER DEVICE

[76] Inventor: Arkady Zirkiev, 108-24 67th Dr., Forest Hills, N.Y. 11375

[21] Appl. No.: 761,937

[22] Filed: Dec. 9, 1996

[51] Int. Cl.⁶ .................................................. B26B 3/00
[52] U.S. Cl. ............................ 30/278; 30/279.6; 30/280
[58] Field of Search .................................. 30/278, 279.6, 30/280, 283, 286, 287, 289, 290, 291; 83/436.7, 852, 858, 932

[56] References Cited

U.S. PATENT DOCUMENTS

| | | | |
|---|---|---|---|
| 1,430,289 | 9/1922 | Dahmer | 30/279.6 |
| 1,714,413 | 5/1929 | Woodward et al. | 30/279.6 |
| 3,942,399 | 3/1976 | Giangiulio | 83/858 |
| 4,184,397 | 1/1980 | Jones | 83/858 |
| 4,281,460 | 8/1981 | Harris | 30/278 |
| 4,290,196 | 9/1981 | Borner | 30/278 |
| 4,573,387 | 3/1986 | Denter et al. | 83/856 |
| 4,624,166 | 11/1986 | Kreth et al. | 83/856 |
| 4,790,488 | 12/1988 | Borner | 30/279.6 |
| 5,001,835 | 3/1991 | Boerner | 30/278 |
| 5,471,746 | 12/1995 | Agrimis | 30/279.6 |

Primary Examiner—Maurina T. Rachuba
Attorney, Agent, or Firm—Michael I. Kroll

[57] ABSTRACT

A food slicer device (10) comprising a food receiving container (12) having an open top (14) with an inner ledge (16) about the open top (14). A working platform (18) has a pair of low rear insert tracks (20), a high forward seat (22) and an open area (23) between the high forward seat (22). The working platform (18) snugly fits into the open top (14) and onto the inner ledge (16) on the food receiving container (12). A back plate (24) slides into the low rear insert tracks (20) of the working platform (18). A front plate (26) has a horizontal cutting blade (28). The front plate (26) snaps into the high forward seat (22) over the open area (23) in the working platform (18). A safety holder (30) engages with a piece of food and slides the piece of food over the back plate (24) to make contact with the horizontal cutting blade (28) on the front plate (26) to cut the piece of food into slices (32). The food slices (32) will drop through the open area (23) in the working platform (18) and go into the food receiving container (12).

20 Claims, 3 Drawing Sheets

FOOD SLICER DEVICE

BACKGROUND OF THE INVENTION

1. Field of the Invention

The instant invention relates generally to kitchen utensils and more specifically it relates to a food slicer device.

2. Description of the Prior Art

Numerous kitchen utensils have been provided in prior art. For example, U.S. Pat. Nos. 4,038,892 to Popeil; 4,120,089 to Borner; 4,212,431 to Doyel; 4,570,519 to Motosko II; 5,075,973 to Borner and Des. 268,562 to Bright all are illustrative of such prior art. While these units may be suitable for the particular purpose to which they address, they would not be as suitable for the purposes of the present invention as heretofore described.

POPEIL, SAMUEL J.

FOOD SLICER WITH INDEXING TURRET

U.S. Pat. No. 4,038,892

A food slicer with an indexing turret is disclosed in which the turret has four faces, two of which have upstanding blades of different sizes on opposed faces and two of the faces have a different offset relationship to the center line of the turret. An angled blade is provided in a table blade segment opposed to the angled turret. A table lock segment slidingly fits into the body of the slicer, and its angled front edge portion locks the indexing turret into position for the varying slices to be made. A pusher which is held by the hand is held on top of the foodstuffs to be cut, and optionally has a guide under portion which, when approaching the last slice, engages the body side guide rails in order to minimize the amount of uncut foodstuff. The table blade segment may be positioned by means of a table blade latch into two parallel ways, one above the other, thereby providing for two different thicknesses of slices due to the position of the blade which is angled at one end of the table blade segment. By combining this with the two flats on the indexing turret, four different thicknesses of slice may be made. By rotating the indexing turret to the two positions where french fry blades and shoe string blades are located, french fries and shoe strings of square cross section or half a square cross section may also be cut. The base of the unit at one portion is provided with a plate recess so that the sliced foodstuffs may be dropped on a plate, and the opposite end of the base is provided with a counter stop which permits securing the unit against the edge of a counter or table to secure it against the reactive forces occasioned by passing the foodstuffs through the blade. In one embodiment the turret indexes automatically by means of a turret cam head arrangement actuating the table lock segment against the yieldable action of a spring.

BORNER, ALFRED

VEGETABLE AND FRUIT-SLICING UTENSILS

U.S. Pat. No. 4,120,089

A slicer has two parallel rails, a removable front plate arranged between the rails, the lower surface of the front plat lying parallel to and at a distance beneath and in front of the upper surface of the back plate, and a blade arranged between the two plates. The blade has a cutting edge at least part of which lies in the same plane as the surface of the back plate. The underside of the front plate has bearers each containing at least one step. The bearers being supported on supporting ledges which project inwardly from the rails when the front plate is inserted. The cutting blade may be corrugated. In manufacturing the utensil, a suitable plastics material is injection-moulded in a single operation onto the cutting blade which has been previously inserted into the mould.

DOYEL, JOHN S.

FOOD PROCESSING UNIT

U.S. Pat. No. 4,212,431

Food processing unit adapted to include several processing devices to permit various foods to be sliced, grated, shredded or otherwise processed into a food receiving chamber, the top portion of which is designed to removably support a working platform. The working platform is designed with a two stage horizontal base with an opening designed to releasably support the processing devices.

MOTOSKO II, STEPHEN J.

VEGETABLE SLICER WITH THICKNESS ADJUSTMENT

U.S. Pat. No. 4,570,519

A vegetable slicer has an integral body with a generally flat portion, a diagonally arranged opening partially transversely of the top portion and a section of the top portion on one side of the opening separated from the remainder of the top portion by longitudinal cutaway areas, so that the section may be moved up and down relative to a knife positioned longitudinally of the diagonal opening. A cam device is provided for moving the section of the top portion vertically.

BORNER, JURGEN

DEVICE FOR CUTTING FRUIT, VEGETABLES, OR THE LIKE INTO SLICES

U.S. Pat. No. 5,075,973

Device for cutting fruit, vegetables, or the like into slices, comprising a blade-holding plate at whose front edge a V-shaped cutter blade is arranged, the latter being composed of two knife blades. Two framing ledges arranged essentially parallel are connected to one other by the blade-holding plate and by at least one further transverse web. An introducible slide plate is guided parallel to the blade-holding plate at the framing ledges, whereto, a narrow gap remains between the back section of the slide plate and the cutter blade. In accord with the invention, the circumferential edge of the knife blades, at least the back region thereof adjoining the V-tip of the cutter blade, are held with form-fit by applied plastic billets in the form of a lying U-profile.

BRIGHT, JOHN E.

VEGETABLE CUTTER

U.S. Pat. No. Des. 268,562

The ornamental design for a vegetable cutter, as shown.

3

Figure 1:
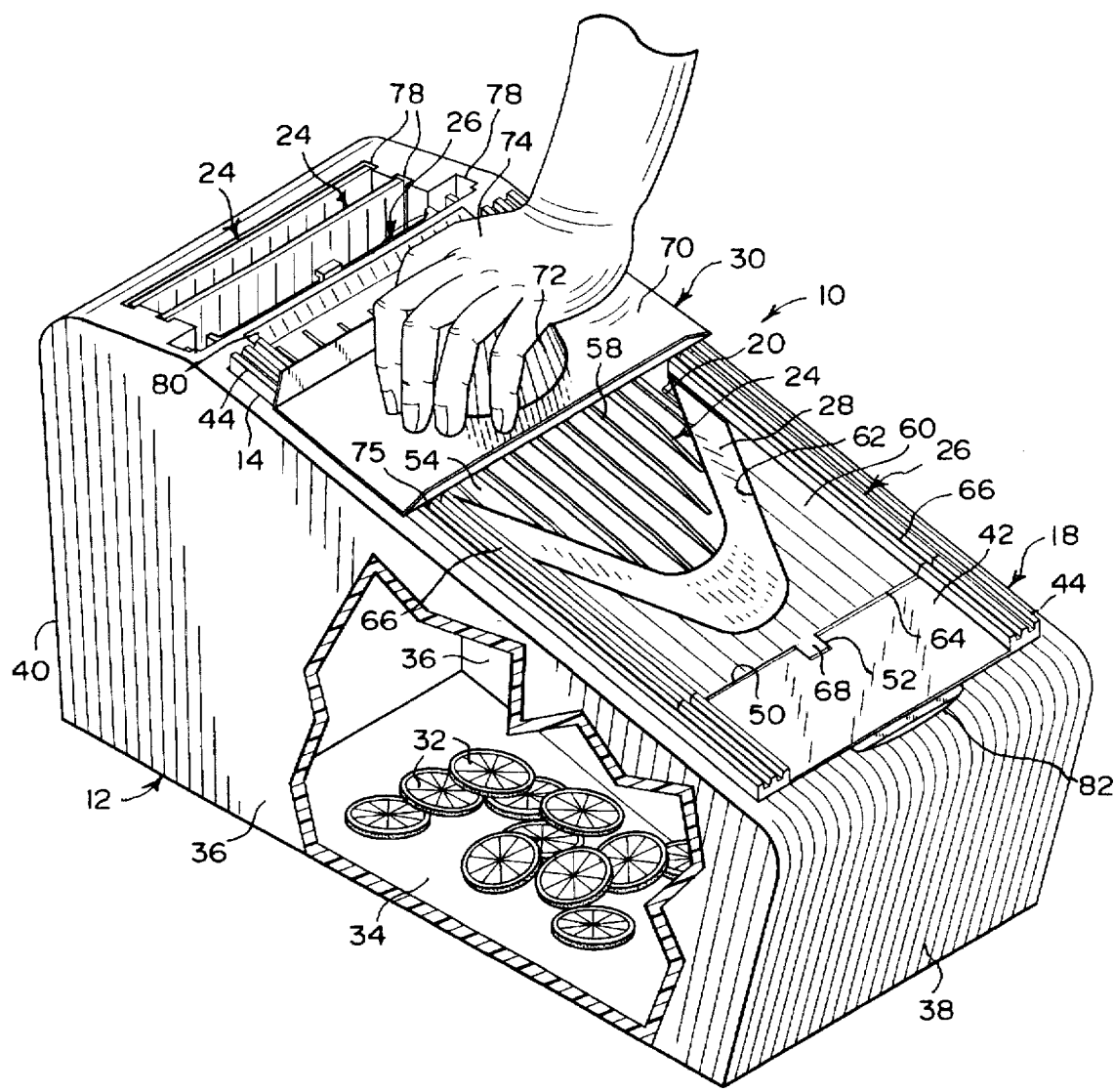
FIG. 1 is a top perspective view of a vegetable cutter showing the new design.
Figure 4:
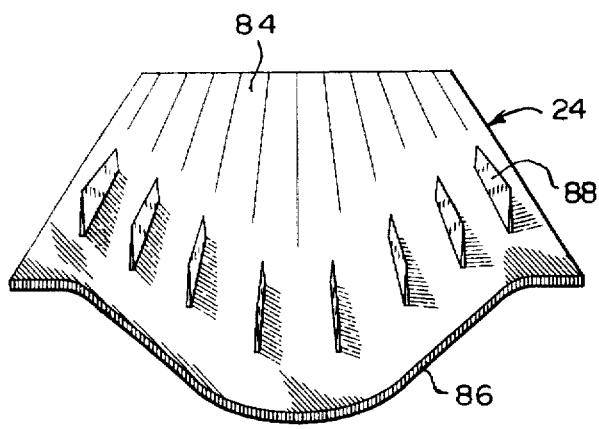

FIG. 4 is an end view thereof as viewed from the left end of FIG. 1; and

Figure 5:
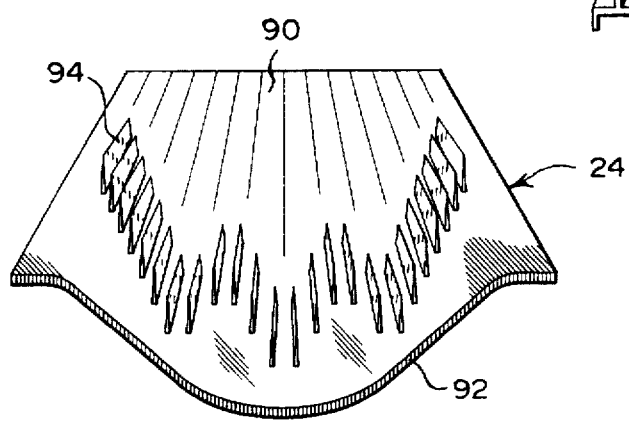

FIG. 5 is an end view thereof as viewed from the right end of FIG. 1.

SUMMARY OF THE INVENTION

A primary object of the present invention is to provide a food slicer device that will overcome the shortcomings of the prior art devices.

Another object is to provide a food slicer device that would allow a person to slice food in a multitude of ways, to collect the slices in a convenient food receiving container, as well as having storage for additional back plates and front plates.

An additional object is to provide a food slicer device that is efficient, convenient, durable, safe and novel, while being a neat solution to slice, dice, shred or cut in julienne-style a wide range of vegetables, fruits and cheeses.

A further object is to provide a food slicer device that is simple and easy to use.

A still further object is to provide a food slicer device that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 1 is a perspective view of the instant invention in use, with the food receiving container broken away.

Figure 2:
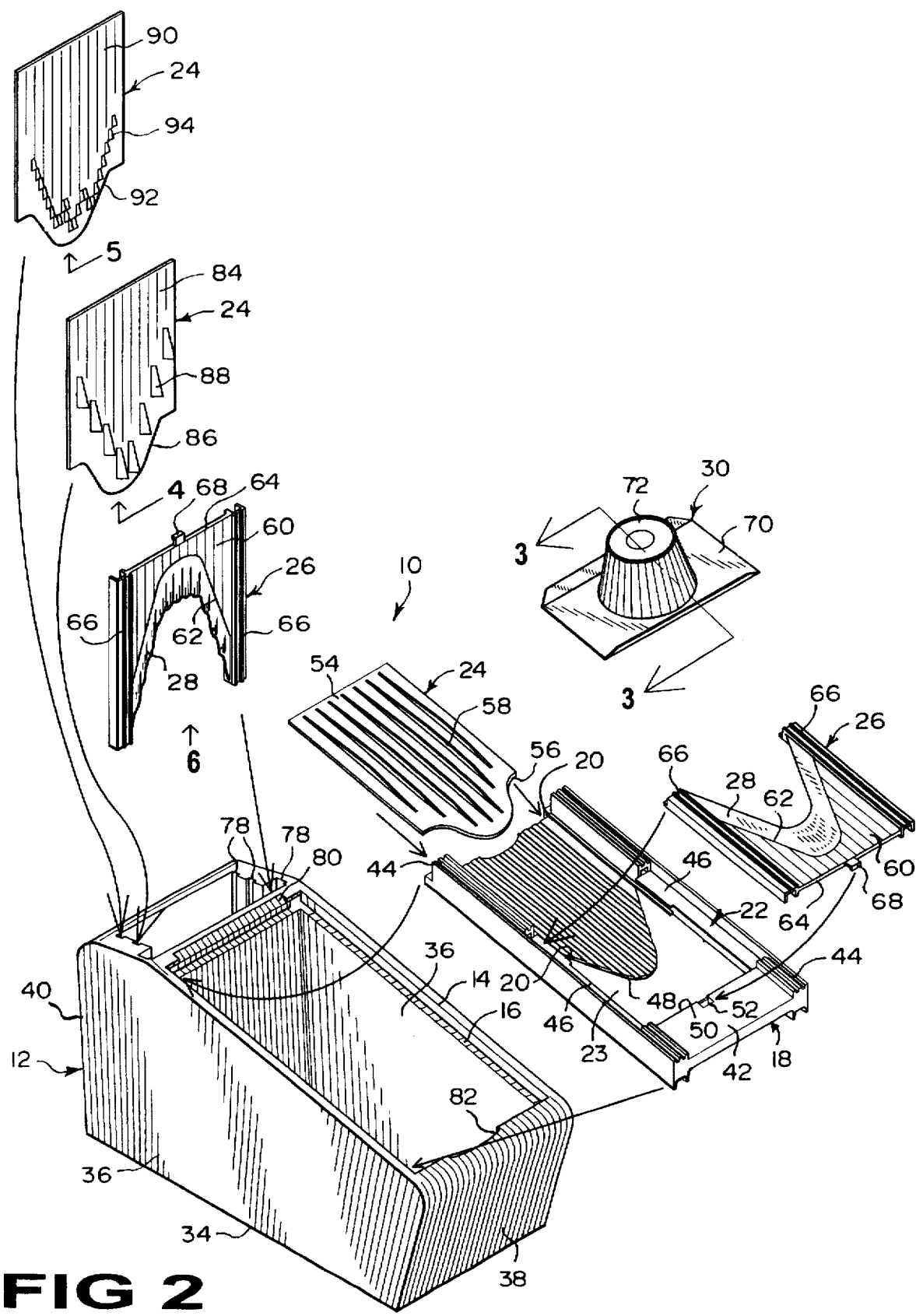
FIG. 2 is a bottom Perspective view thereof.

FIG. 2 is an exploded perspective view of the instant invention, showing the various components thereof.

Figure 3:
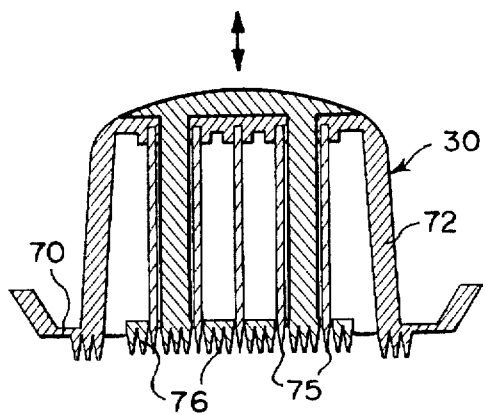
FIG. 3 is a side elevational view.

FIG. 3 is an enlarged cross sectional view of the safety holder taken along line 3—3 in FIG. 2.

FIG. 4 is an enlarged perspective view of the large strip slice back plate taken in the direction of arrow 4 in FIG. 2.

FIG. 5 is an enlarged perspective view of the all strip slice back plate taken in the direction of arrow 5 in FIG. 2.

Figure 6:
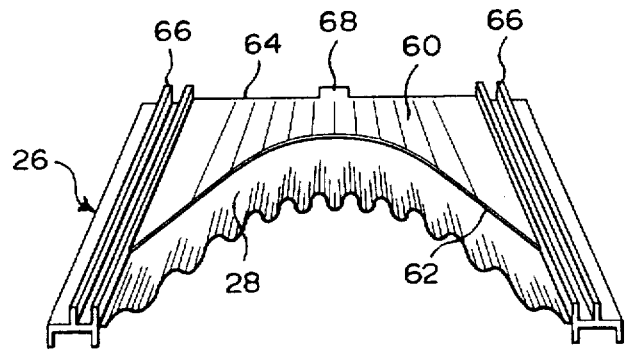

FIG. 6 is an enlarged perspective view of the wavy blade front plate taken in the direction of arrow 6 in FIG. 2.

Similar reference characters denote corresponding features consistently throughout the attached drawings.

DETAILED DESCRIPTION OF THE PREFERRED EMBODIMENTS

Turning now descriptively to the drawings, in which similar reference characters denote similar elements throughout the several views, FIGS. 1 and 2 illustrate a food slicer device 10 comprising a food receiving container 12 having an open top 14 with an inner ledge 16 about the open top 14. A working platform 18 has a pair of low rear insert tracks 20, a high forward seat 22 and an open area 23 between the high forward seat 22. The working platform 18 snugly fits into the open top 14 and onto the inner ledge 16 on the food receiving container 12. A back plate 24 slides into the low rear insert tracks 20 of the working platform 18. A front plate 26 has a horizontal cutting blade 28. The front plate 26 snaps into the high forward seat 22 over the open area 23 in the working platform 18. A safety holder 30 engages with a piece of food and slides the piece of food over the back plate 24, to make contact with the horizontal cutting blade 28 on the front plate 26 to cut the piece of food into slices 32. The food slices 32 will drop through the open area 23 in the working platform 18 and into the food receiving container 12.

The food receiving container 12 includes a rectangular horizontal bottom wall 34. A pair of long side walls 36 extend upwardly from the bottom wall 34. A pair of short end walls 38, 40 extend upwardly from the bottom wall 34. The front end wall 38 is shorter in height than the rear end wall 40. The open top 14 with the inner ledge 16 being rectangular will slope downward at an angle from the rear end wall 40 to the front end wall 38.

The working platform 18 consists of a flat rectangular base 42. A pair of long side guide rails 44 are integral with and are on opposite long sides of the flat rectangular base 42. Each long side guide rail 44 has a cutout section 46 located at one side of the open area to form the high forward seat 22. The flat rectangular base 42 has a rear curved edge 48 and a front upward turned straight edge 50 in the open area 23. The front upward turned straight edge 50 has a centrally located socket 52 formed therein.

The back plate 24 contains a generally rectangular flat insert 54, having a front curved edge 56. A plurality of longitudinal parallel guide ribs 58 are on opposite surfaces of the insert 54. Each guide rib 58 is tapered at a front end and a rear end, to allow the piece of food to easily slide over the guide ribs 58. The guide ribs 58 are higher on one surface than on an opposite surface of the insert 54. When the back plate 24 is flipped over and inserted into the rear insert tracks 20 of the working platform 18, the thicknesses of the slices 32 of food will be changed.

The front plate 26 includes a flat board 60, having a rear curved edge 62 and a front straight edge 64. The horizontal cutting blade 28 has a curved shaped and is mounted to the rear curved edge 62 on the flat board 60. A pair of short side guide rails 66 are integral with and are on opposite sides of the flat board 60. A clip 68 is centrally located on the front straight edge 64 on the flat board 60. When the flat board 60 is placed into the high forward seat 22 in the working platform 18, the short side guide rails 66 will fit into the cutout sections 46 in the long side guide rails 44, while the clip 68 will snap fit within the socket 52 of the working platform 18 to be held stationary thereto.

The safety holder 30, as shown in FIGS. 1, 2 and 3, consists of a horizontal base 70 that extends across the working platform 18 and rides upon the long side guide rails 44 and the short side guide rails 66 on the front plate 26. A knob 72 extends upwardly from the horizontal base 70 to be grasped by a hand 74 of a person. A plurality of pointed pins 75 and pointed projections 76 are on the bottom of the base 70, to engage with the piece of food.

The food receiving container 12 further has a plurality of vertical storage slots 78 between the rear end wall 40 and the open top 14. The back plates 24 and the front plates 26 can be inserted within the vertical storage slots 78 when not in use. An angled surface 80 is formed on a rear portion of the inner ledge 16, so as to guide the back plate 24 into the low rear insert tracks 20 of the working platform 18. A finger grip cutout 82 is formed on a front portion of the inner ledge 16, so that a person can insert fingers into the finger grip cutout 82 and lift the working platform 18 out from the inner ledge 16.

The back plate 24, as shown in FIGS. 2 and 4, can consist of a generally rectangular flat insert 84 having a front curved edge 86. A plurality of large upstanding parallel stainless steel cutting knives 88 are on a top surface of the insert 84, so that the piece of food will be cut both vertically as well as horizontally into thick strips.

The back plate 24, as shown in FIGS. 2 and 5, can also consist of a generally rectangular flat insert 90 having a front curved edge 92. A plurality of small upstanding parallel stainless steel cutting knives 94 are on a top surface of the insert 90, so that the piece of food will be cut both vertically, as well as horizontally into thin strips.

The horizontal cutting blade 28 in the front plate 26, as shown in FIGS. 1 and 2, can be flat, so as to slice the piece of food into flat slices 32. The horizontal cutting blade 28 in the front plate 26, as shown in FIGS. 2 and 6, can also be wavy, so as to slice the piece of food into wavy slices.

LIST OF REFERENCE NUMBERS 10 food slicer device
12 food receiving container of 10
14 open top in 12
16 inner ledge about 14
18 working platform of 10
20 low rear insert track in 18
22 high forward seat in 18
23 open area in 18
24 back plate of 10
26 front plate of 10
28 horizontal cutting blade in 26
30 safety holder of 10
32 food slice
34 rectangular horizontal bottom wall of 12
36 side wall of 12
38 short front end wall of 12
40 high rear end wall of 12
42 flat rectangular base of 18
44 long side guide rail of 18
46 cutout section in 44 for 22
48 rear curved edge of 42 at 23
50 front upward turned straight edge of 42 at 23
52 centrally located socket in 50
54 generally rectangular flat insert of 24
56 front curved edge of 54
58 guide rib on 54
60 flat board of 26
62 rear curved edge of 60
64 front straight edge of 60
66 short side guide rail of 26
68 clip on 64
70 horizontal base of 30
72 knob of 30
74 hand of a person
75 pointed pin of 30
76 pointed projection of 30
78 vertical storage slot in 12
80 angled surface on 16
82 finger grip cutout in 16
84 generally rectangular flat insert of 24
86 front curved edge of 84
88 large upstanding stainless steel cutting knife on 84
90 generally rectangular flat insert of 24
92 front curved edge of 90
94 small upstanding stainless steel cutting knife on 90

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A food slicer device comprising:
   a) a food receiving container having an open top with an inner ledge about said open top, said food receiving container including:
      i) a rectangular horizontal bottom wall;
      ii) a pair of long side walls extending upwardly from said bottom wall;
      iii) a pair of short end walls extending upwardly from said bottom wall, with said front end wall shorter in height than said rear end wall, so that said open top slopes downward at an angle from said rear end wall to said front end wall; and
      iv) a plurality of vertical storage slots between said rear end wall and said open top;
   b) a working platform having a pair of low rear insert tracks, a high forward seat and an open area between said high forward seat, whereby said working platform snugly fits into said open top and onto said inner ledge on said food receiving container;
   c) a back plate which slides into said low rear insert tracks of said working platform;
   d) a front plate having a horizontal cutting blade, wherein said front plate snaps into said high forward seat over said open area in said working platform; and
   e) a safety holder which engages with a piece of food and slides the piece of food over said back plate to make contact with said horizontal cutting blade on said front plate to cut the piece of food into slices, so that the food slices will drop through said open area in said working platform and go into said food receiving container.

2. A food slicer device as recited in claim 1, wherein said working platform includes:
   a) a flat rectangular base;
   b) a pair of long side guide rails integral with and on opposite long sides of said flat rectangular base, with each said long side guide rail having a cutout section located at one side of said open area to form said high forward seat;
   c) said flat rectangular base having a rear curved edge and a front upward turned straight edge in said open area; and
   d) said front upward turned straight edge having a centrally located socket formed therein.

3. A food slicer device as recited in claim 1, wherein said back plate includes:
   a) a generally rectangular flat insert having a front curved edge; and
   b) a plurality of longitudinal parallel guide ribs on opposite surface of said insert, each said guide rib is tapered at a front end and a rear end, to allow the piece of food to easily slide over said guide ribs, said guide ribs are higher on one surface than on an opposite surface of said insert, so that when said back plate is flipped over and inserted into said rear insert tracks of said working platform the thicknesses of the slices of food will be changed.

4. A food slicer device as recited in claim 2, wherein said front plate includes:
   a) a flat board having a rear curved edge and a front straight edge;
   b) said horizontal cutting blade having a curved shape and mounted to said rear curved edge on said flat board;
   c) a pair of short side guide rails integral with and on opposite sides of said flat board; and
   d) a clip centrally located on said front straight edge on said flat board, so that when said flat board is placed into said high forward seat in said working platform, said short side guide rails will fit into said cutout sections in said long side guide rails, while said clip will snap fit within said socket of said working platform to be held stationary thereto.

5. A food slicer device as recited in claim 3, wherein said safety holder includes:
   a) a horizontal base that extends across said working platform and ride upon said long side guide rails and said short side guide rails on said front plate;
   b) a knob extends upwardly from said horizontal base to be grasped by a hand of a person; and
   c) a plurality of pointed pins and pointed projections on the bottom of said base to engage with the piece of food.

6. A food slicer device as recited in claim 1, wherein said food receiving container further has an angled surface formed on a rear portion of said inner ledge, so as to guide said back plate into said low rear insert tracks of said working platform.

7. A food slicer device as recited in claim 1, wherein said food receiving container further has a finger grip cutout formed on a front portion of said inner ledge, so that a person can insert fingers into said finger grip cutout and lift said working platform out from said inner ledge.

8. A food slicer device as recited in claim 1, wherein said back plate includes:
   a) a generally rectangular flat insert having a front curved edge; and
   b) a plurality of large upstanding parallel stainless steel cutting knives on a surface of said insert, so that the piece of food will be cut both vertically, as well as horizontally into thick strips.

9. A food slicer device as recited in claim 1, wherein said back plate includes:
   a) a generally rectangular flat insert having a front curved edge; and
   b) a plurality of small upstanding parallel stainless steel cutting knives on a surface of said insert, so that the piece of food will be cut both vertically, as well as horizontally into thin strips.

10. A food slicer device as recited in claim 1, wherein said horizontal cutting blade in said front plate is flat, so as to slice the piece of food into flat slices.

11. A food slicer device as recited in claim 1, wherein said horizontal cutting blade in said front plate is wavy, so as to slice the piece of food into wavy slices.

12. A food slicer device as recited in claim 2, wherein said back plate includes:
    a) a generally rectangular flat insert having a front curved edge; and
    b) a plurality of longitudinal parallel guide ribs on opposite surfaces of said insert, whereby each said guide rib is tapered at a front end and a rear end, to allow the piece of food to easily slide over said guide ribs, said guide ribs are higher on one surface than on an opposite surface of said insert, so that when said back plate is flipped over and inserted into said rear insert tracks of said working platform the thicknesses of the slices of the food will be changed.

13. A food slicer device as recited in claim 12, wherein said front plate includes:
    a) a flat board having a rear curved edge and a front straight edge;
    b) said horizontal cutting blade having a curved shape and mounted to said rear curved edge on said flat board;
    c) a pair of short side guide rails integral with and on opposite sides of said flat board; and
    d) a clip centrally located on said front straight edge on said flat board, so that when said flat board is placed into said high forward seat in said working platform, said short side guide rails will fit into said cutout sections in said long side guide rails, while said clip will snap fit within said socket of said working platform to be held stationary thereto.

14. A food slicer device as recited in claim 13, wherein said safety holder includes:
    a) a horizontal base that extends across said working platform and ride upon said long side guide rails and said short side guide rails on said front plate;
    b) a knob extends upwardly from said horizontal base to be grasped by a hand of a person; and
    c) a plurality of pointed pins and pointed projections on the bottom of said base to engage with the piece of food.

15. A food slicer device as recited in claim 14, wherein said food receiving container further has an angled surface formed on a rear portion of said inner ledge, so as to guide said back plate into said low rear insert tracks of said working platform.

16. A food slicer device as recited in claim 15, wherein said food receiving container further has a finger grip cutout formed on a front portion of said inner ledge, so that a person can insert fingers into said finger grip cutout and lift said working platform out from said inner ledge.

17. A food slicer device as recited in claim 2, wherein said back plate includes:
    a) a generally rectangular flat insert having a front curved edge; and
    b) a plurality of large upstanding parallel stainless steel cutting knives on a surface of said insert, so that the piece of food will be cut both vertically, as well as horizontally into thick strips.

18. A food slicer device as recited in claim 2, wherein said back plate includes:
    a) a generally rectangular flat insert having a front curved edge; and
    b) a plurality of small upstanding parallel stainless steel cutting knives on a surface of said insert, so that the piece of food will be cut both vertically, as well as horizontally into thin strips.

19. A food slicer device as recited in claim 2, wherein said horizontal cutting blade in said front plate is flat, so as to slice the piece of food into flat slices.

20. A food slicer device as recited in claim 19, wherein said horizontal cutting blade in said front plate is wavy, so as to slice the piece of food into wavy slices.

* * * * *